(12) United States Patent
Shivashankaraiah et al.

(10) Patent No.: US 9,384,138 B2
(45) Date of Patent: Jul. 5, 2016

(54) TEMPORAL TRACKING OF CACHE DATA

(71) Applicant: LSI Corporation, San Jose, CA (US)

(72) Inventors: Vinay Bangalore Shivashankaraiah, Bangalore (IN); Kumaravel Thillai, Tamilnadu (IN)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 126 days.

(21) Appl. No.: 14/276,429

(22) Filed: May 13, 2014

(65) Prior Publication Data

US 2015/0324295 A1    Nov. 12, 2015

(30) Foreign Application Priority Data

May 9, 2014    (IN) ................ 527KOL2014

(51) Int. Cl.
    *G06F 12/00*    (2006.01)
    *G06F 12/08*    (2016.01)
    *G06F 12/12*    (2016.01)

(52) U.S. Cl.
    CPC ........ *G06F 12/0871* (2013.01); *G06F 12/0802* (2013.01); *G06F 12/122* (2013.01); *G06F 2212/26* (2013.01); *G06F 2212/28* (2013.01); *G06F 2212/604* (2013.01); *G06F 2212/69* (2013.01)

(58) Field of Classification Search
    CPC ............ G06F 12/0802; G06F 12/0871; G06F 12/0873; G06F 2212/26; G06F 2212/28
    See application file for complete search history.

(56) References Cited

U.S. PATENT DOCUMENTS

| | | | |
|---|---|---|---|
| 6,738,866 B2 | 5/2004 | Ting | |
| 2014/0223106 A1* | 8/2014 | Shivashankaraiah | G06F 12/0866 711/136 |

* cited by examiner

*Primary Examiner* — Shawn X Gu (57) ABSTRACT

A data storage system with a cache organizes cache windows into lists based on the number of cache lines accessed during input/output operations. The lists are maintained in temporal queues with cache windows transferred from prior temporal queues to a current temporal queue. Cache windows are removed from the oldest temporal queue and least accessed cache window list whenever cached data needs to be removed for new hot data.

17 Claims, 6 Drawing Sheets

FIG. 7

TEMPORAL TRACKING OF CACHE DATA

PRIORITY

The present application claims the benefit under 35 U.S.C. §119(e) of Indian Patent Application Number 527/KOL/2014, filed May 9, 2014, which is incorporated herein by reference.

BACKGROUND OF THE INVENTION

In data storage systems having a cache, frequently accessed data is classified as "hot" and is replicated in the cache. As different data becomes hot, data already replicated in the cache needs to be removed to make room for new hot data. Least recently used lists track data blocks in the cache that have gone longest without a data access. This system replaces least recently used data blocks with new hot data blocks. This methodology does not provide optimal performance because data blocks aggressively accessed for periods in the past can skew future results when deciding what data to remove. Likewise, when the amount of active data exceeds the size of the cache, the cache can be thrashed trying to keep the most recent data in the cache.

Consequently, it would be advantageous if an apparatus existed that is suitable for prioritizing data in a cache to avoid thrashing.

SUMMARY OF THE INVENTION

Accordingly, the present invention is directed to a novel method and apparatus for prioritizing data in a cache to avoid thrashing.

In at least one embodiment, a data storage system with a cache organizes cache windows into lists based on the number of cache lines accessed during input/output operations. The lists are maintained in temporal queues with cache windows transferred from prior temporal queues to a current temporal queue. Cache windows are removed from the oldest temporal queue and least accessed cache window list whenever cached data needs to be removed for new hot data.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the subject matter disclosed, which is illustrated in the accompanying drawings. The scope of the invention is limited only by the claims; numerous alternatives, modifications and equivalents are encompassed. For the purpose of clarity, technical material that is known in the technical fields related to the embodiments has not been described in detail to avoid unnecessarily obscuring the description.

Figure 1:
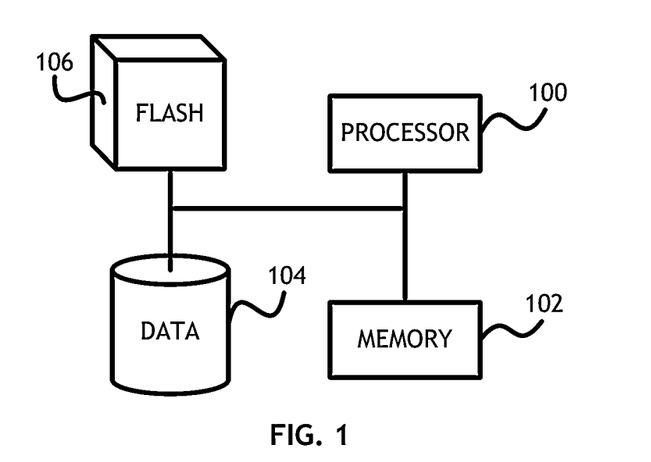
FIG. 1 shows a computer system useful for implementing embodiments of the present invention.

Referring to FIG. 1, a computer system useful for implementing embodiments of the present invention is shown. In at least one embodiment of the present invention, a data storage system includes a processor 100, memory 102 connected to the processor 100, one or more data storage elements 104 connected to the processor 100, and flash storage element 106 connected to processor 100. The flash storage element 106 is used for storing the cached data associated with one or more data storage elements 104. A portion of the memory 102 is configured to track the cached data on flash storage element 106 so that hot data in the one or more data storage elements 104 is replicated in the cache in the flash storage element 106. The processor 100 is configured to receive input/output requests directed toward data in the one or more data storage elements 104.

In at least one embodiment, the processor 100 maintains hot data in the cache by maintaining data structures identifying data in the cache organized according to proportions of data accessed within given data blocks during defined temporal queues. Temporal queues are defined by a duration or a number of input/output operations, or some other factor according to the principles defined herein. During each successive time period, data blocks associated with input/output operations during that time period are moved to a data structure associated with the current temporal queue. When new data in the one or more data storage elements 104 is identified as hot, data blocks are removed from the cache based on their location in the oldest temporal queue first.

Figure 2:
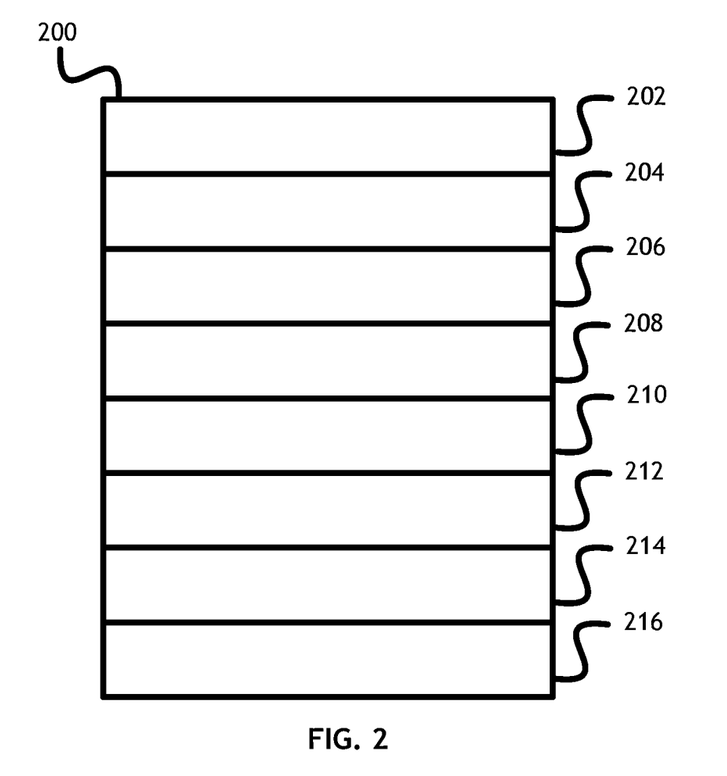
FIG. 2 shows a block diagram of a data structure useful for implementing one embodiment of the present invention.

Referring to FIG. 2, a block diagram of a data structure useful for implementing one embodiment of the present invention is shown. In at least one embodiment, a cache window 200 defines a data block replicated from a data storage element to a cache. The cache window 200 comprises a plurality of cache lines 202, 204, 206, 208, 210, 212, 214, 216. Data access associated with input/output operations may be quantized by cache line 202, 204, 206, 208, 210, 212, 214, 216. In at least one embodiment of the present invention, a data structure tracking data access in a cache identifies and records which cache lines 202, 204, 206, 208, 210, 212, 214, 216 are accessed during a particular time period.

Figure 3:
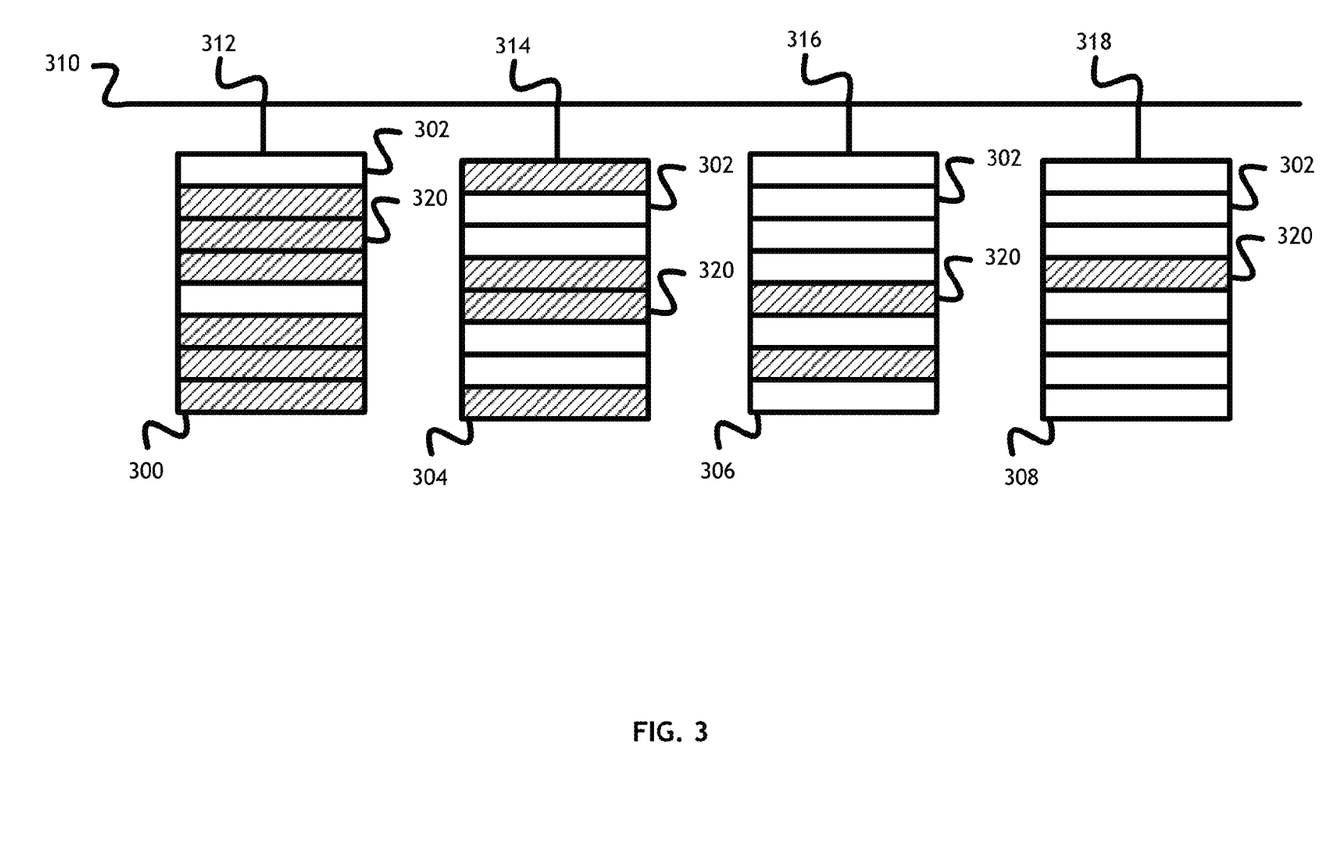
FIG. 3 shows a block diagram of a data structure according to at least one embodiment of the present invention.

Referring to FIG. 3, a block diagram of a data structure according to at least one embodiment of the present invention is shown. In at least one embodiment, a data structure configured to track data in a cache comprises a temporal queue 310. The temporal queue 310 is divided into lists 312, 314, 316, 318 of cache windows 300, 304, 306, 308. In at least one embodiment, the lists 312, 314, 316, 318 are configured as "least recently used" lists.

In at least one embodiment, each list 312, 314, 316, 318 includes cache windows 300, 304, 306, 308 organized based on the number of accessed cache lines 320 during input/ output operations during a temporal period associated with the temporal queue 310. For clarity, only a single cache window 300, 304, 306, 308 is shown associated with each list 312, 314, 316, 318. In actual implementation, multiple cache windows 300, 304, 306, 308 could be included in each list 312, 314, 316, 318 as appropriate.

Figure 4:
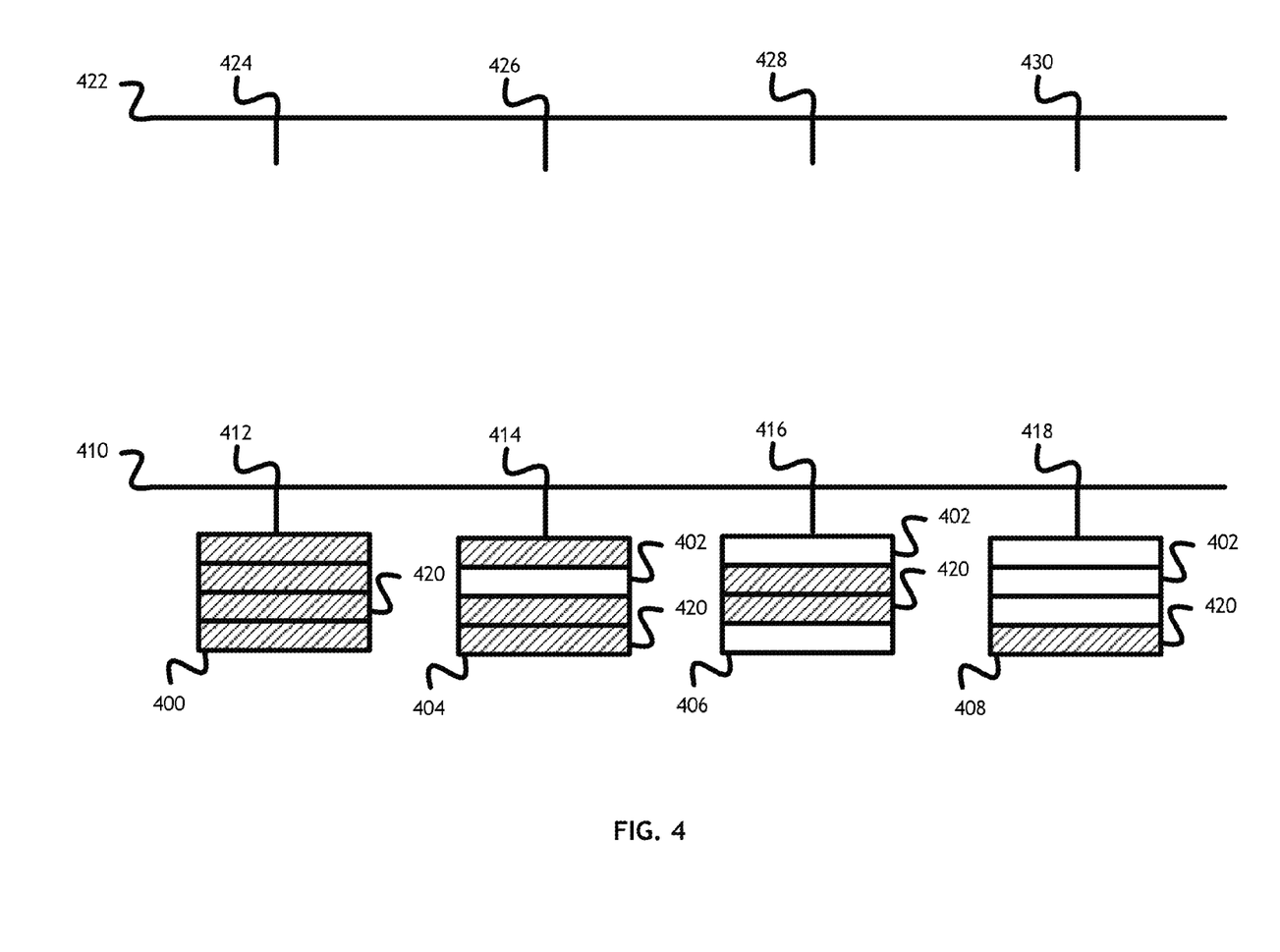
FIG. 4 shows a block diagram of several data structures according to at least one embodiment of the present invention.

Referring to FIG. 4, a block diagram of several data structures according to at least one embodiment of the present invention is shown. In at least one exemplary embodiment, a data structure configured to track data in a cache comprises a prior temporal queue 410. The prior temporal queue 410 is divided into prior temporal lists 412, 414, 416, 418 of cache windows 400, 404, 406, 408. In at least one embodiment, the prior temporal lists 412, 414, 416, 418 are configured as "least recently used" lists.

In at least one embodiment, each prior temporal list 412, 414, 416, 418 includes cache windows 400, 404, 406, 408 organized based on the number of accessed cache lines 420 during input/output operations during the prior temporal period associated with the prior temporal queue 410. For clarity, only a single cache window 400, 404, 406, 408 is shown associated with each prior temporal list 412, 414, 416, 418. In actual implementation, multiple cache windows 400, 404, 406, 408 could be included in each prior temporal list 412, 414, 416, 418 as appropriate.

A current temporal queue 422 is divided into current temporal lists 424, 426, 428, 430 for receiving cache windows 400, 404, 406, 408 when an input/output operation processed during a current temporal period, the cache window 400, 404, 406, 408 associated with the input/output operation is moved to an appropriate current temporal list 424, 426, 428, 430.

Figure 5:
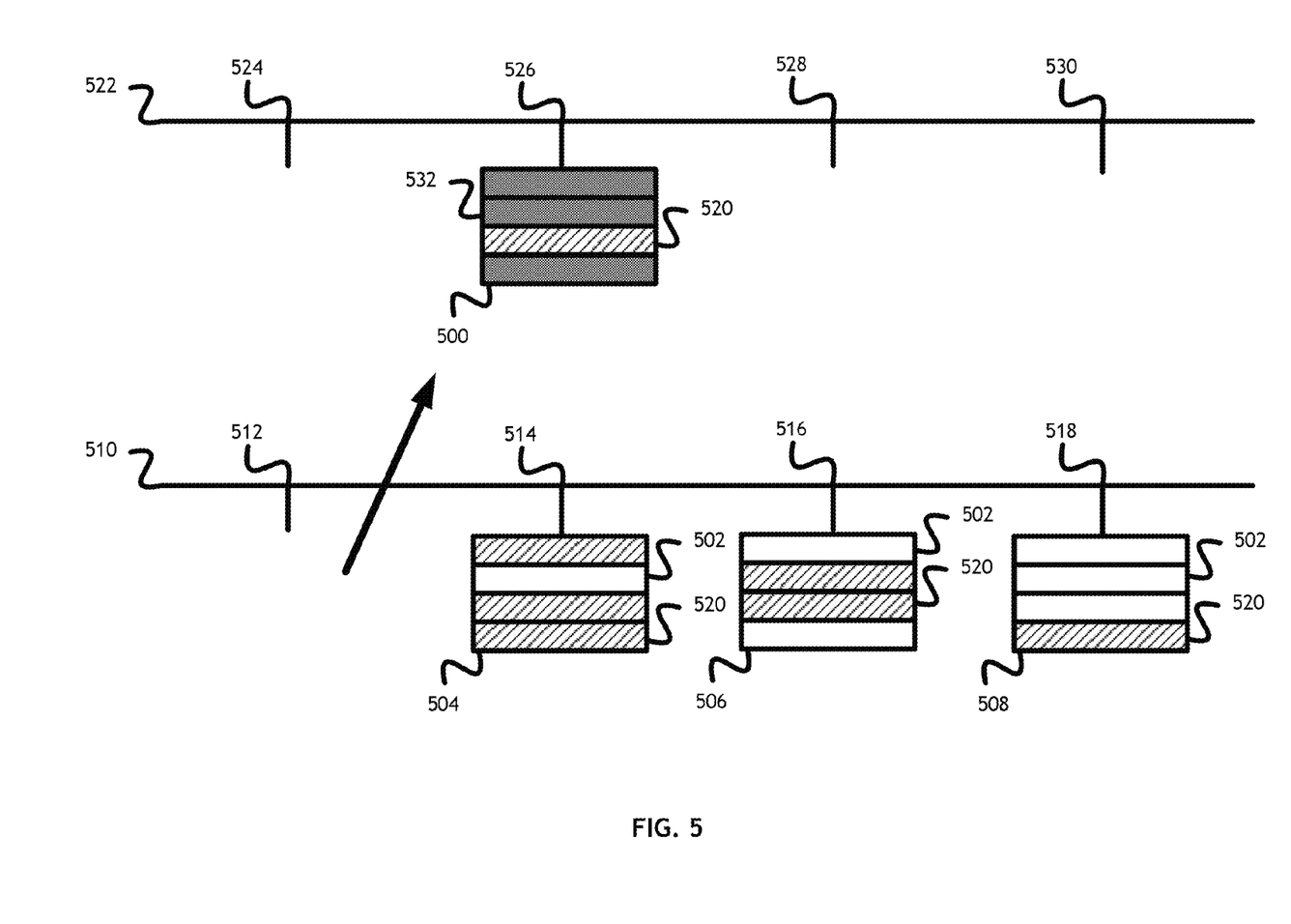
FIG. 5 shows a block diagram of several data structures according to at least one embodiment of the present invention.

Referring to FIG. 5, a block diagram of several data structures according to at least one embodiment of the present invention is shown. In at least one exemplary embodiment, a data structure configured to track data in a cache comprises a prior temporal queue 510. During a previous temporal period, the prior temporal queue 510 was current, and cache windows 500, 504, 506, 508 were added to the prior temporal queue 510 based on the number of accessed cache lines 520. The prior temporal queue 510 is divided into prior temporal lists 512, 514, 516, 518. In at least one embodiment, the prior temporal lists 512, 514, 516, 518 are configured to store cache windows 500, 504, 506, 508 such that a first prior temporal list 512 stores cache windows 500, 504, 506, 508 where all cache lines 502, 520, 532 where accessed during the prior (then current) temporal period. Likewise, a second prior temporal list 514 stores cache windows 500, 504, 506, 508 where all but one cache line 502, 520, 532 were accessed during the prior (then current) temporal period; a third prior temporal list 516 stores cache windows 500, 504, 506, 508 where all but two cache line 502, 520, 532 were accessed during the prior (then current) temporal period; and a fourth prior temporal list 518 stores cache windows 500, 504, 506, 508 where all but three cache line 502, 520, 532 was accessed during the prior (then current) temporal period.

A current temporal queue 522 is divided into current temporal lists 524, 526, 528, 530 for receiving cache windows 500, 504, 506, 508 when an input/output operation processed during the current temporal period accesses data from a cache window 500, 504, 506, 508 associated with the input/output operation is moved to an appropriate current temporal list 524, 526, 528, 530. For example, when an input/output operation accesses all but one cache line 532 in a first cache window 500, the first cache window 500 previously organized into a first prior temporal list 512 is moved to a second current temporal list 526 where the second current temporal list 526 is configured to store cache windows 500, 504, 506, 508 wherein all but one cache line 502, 520, 532 in a cache window 500, 504, 506, 508 is accessed during a temporal period.

Figure 6:
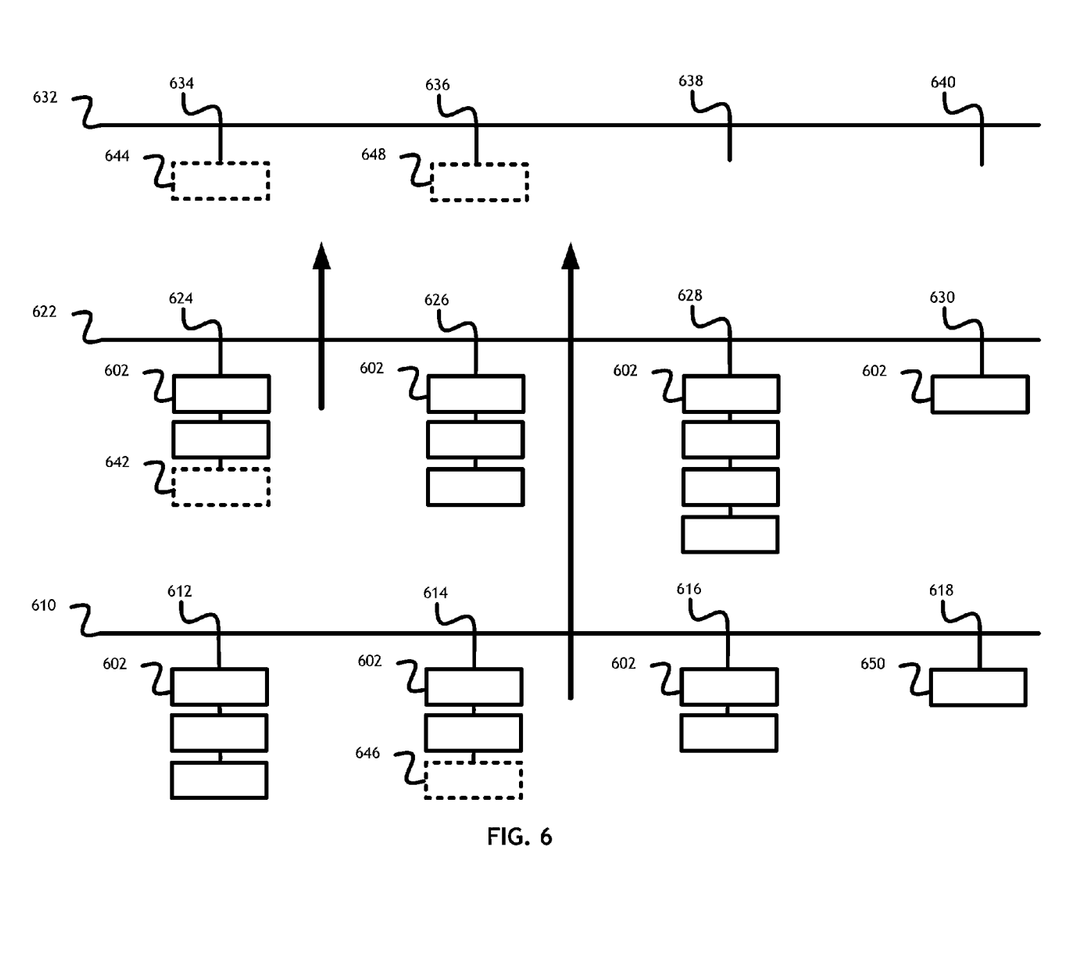
FIG. 6 shows a block diagram of several data structures according to at least one embodiment of the present invention.

Referring to FIG. 6, a block diagram of several data structures according to at least one embodiment of the present invention is shown. In at least one exemplary embodiment, a current temporal queue 632 is configured to store current cache window lists 634, 636, 638, 640, each of the current cache window lists 634, 636, 638, 640 configured to store cache windows 602, 642, 644, 646, 648, 650 according to the number of cache lines in each cache window 602, 642, 644, 646, 648, 650 accessed during an associated temporal period.

A first prior temporal queue 622 is configured to store prior cache window lists 624, 626, 628, 630, each of the prior cache window lists 624, 626, 628, 630 configured to store cache windows 602, 642, 644, 646, 648, 650 according to the number of cache lines in each cache window 602, 642, 644, 646, 648, 650 accessed during an associated temporal period, immediately prior to the current temporal period.

A second prior temporal queue 610 is configured to store prior cache window lists 612, 614, 616, 618, each of the prior cache window lists 612, 614, 616, 618 configured to store cache windows 602, 642, 644, 646, 648, 650 according to the number of cache lines in each cache window 602, 642, 644, 646, 648, 650 accessed during an associated temporal period.

During a temporal period associated with the second prior temporal queue 610, when input/output operations access data in the cache, cache windows 602, 642, 644, 646, 648, 650 are organized into prior cache window lists 612, 614, 616, 618 according to the number of cache lines accessed in each cache window 602, 642, 644, 646, 648, 650. For example, cache windows where all of the cache lines were accessed during the associated temporal period are organized into a first prior cache window list 612. Where multiple cache windows are in the same cache window list 612, 614, 616, 618, the cache windows may be organized into hash lists or some other appropriate data structure to allow cache windows to be quickly identified.

During a subsequent temporal period associated with the first temporal queue 622, when input/output operations access data in the cache, cache windows 602, 642, 644, 646, 648, 650 are organized into prior cache window lists 624, 626, 628, 630 according to the number of cache lines accessed in each cache window 602, 642, 644, 646, 648, 650. For example, cache windows where all of the cache lines were accessed during the associated temporal period are organized into a first prior cache window list 624. Where multiple cache windows are in the same cache window list 624, 626, 628, 630, the cache windows may be organized into hash lists or some other appropriate data structure to allow cache windows to be quickly identified.

During a current temporal period associated with a current temporal queue 632, when input/output operations access data in the cache and cache windows 602, 642, 644, 646, 648, 650 associated with such data are organized into prior cache window lists 612, 614, 616, 618, 624, 626, 628, 630, the cache windows 602, 642, 644, 646, 648, 650 are found and moved to appropriate current cache window lists 634, 636, 638, 640 according to the number of cache lines accessed in each cache window 602, 642, 644, 646, 648, 650 during the current temporal period. For example, where all of the cache lines in a first prior accessed cache window 642 were accessed during a prior temporal period associated with the first prior temporal queue 622, the first prior accessed cache window 642 would have been previously placed in the first prior cache window list 624. Subsequently, all of the cache lines in the first prior accessed cache window 642 are accessed during the current temporal period. The first prior accessed cache window 642 is then identified and removed from the first prior cache window list 624 and becomes the first current cache window 644 in the first current cache window list 634. The first current cache window 644 is shown added to the first current cache window list 634, but could be added to any current cache window list 634, 636, 638, 640 depending on the number of cache lines accessed.

Additionally, where all but one of the of the cache lines in a second prior accessed cache window 646 were accessed during a prior temporal period associated with the second prior temporal queue 610, the second prior accessed cache window 646 would have been previously placed in the second prior cache window list 614. Subsequently, all but one of the cache lines in the second prior accessed cache window 646 are accessed during the current temporal period. The second prior accessed cache window 646 is then identified and removed from the second prior cache window list 610 and becomes the second current cache window 648 in the second current cache window list 636. The second current cache window 648 is shown added to the second current cache window list 636, but could be added to any current cache window list 634, 636, 638, 640 depending on the number of cache lines accessed.

At some point, where new hot data is identified for inclusion in the cache, and there is inadequate free space in the cache for the new hot data, existing data must be removed from the cache. Data is removed based on the organized location of cache windows 602, 642, 644, 646, 648, 650 within the temporal queue 610, 622, 632 data structures. For example, a lowest priority cache window 650 located in the second prior temporal queue 610 (in the present example, the second prior temporal queue 610 is the oldest temporal queue) and in the fourth cache window list 618 (in the present example, the fourth cache window list 618 includes cache windows with the least number of cache lines accessed during the associated prior temporal period.

Figure 7:
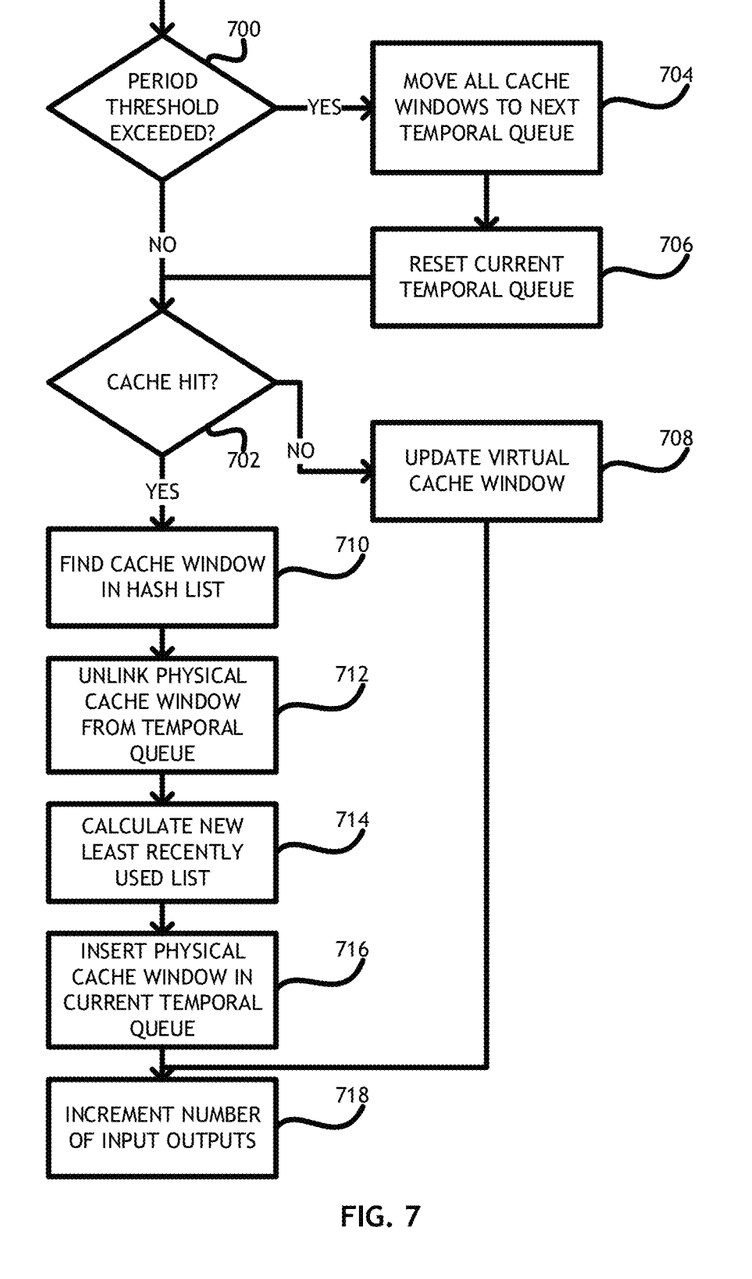
FIG. 7 shows a flowchart of one embodiment of the present invention.

Referring to FIG. 7, a flowchart of one embodiment of the present invention is shown. A temporal period threshold is defined to distinguish one temporal period from the next. The temporal period threshold may be defined by the number of input/output operations, a span of time or some other appropriate metric. Furthermore, the temporal period threshold can be adjusted dynamically to maintain an optimal distribution of cache windows in cache window lists and temporal queues. During an input/output operation, it is determined 700 whether or not the temporal period threshold has been exceeded. If so, all cache windows organized into lists in the current temporal queue are moved 704 to the next temporal queue. The current temporal queue is then reset 706 and the virtual cache window is updated 708. A counter associated with the threshold is incremented 718, and the process repeats.

If the temporal period threshold is not exceeded, it is determined 702 if the input/output operation is associated with data in the cache. If the input/output operation is not associated with data in the cache, the virtual cache window is updated 708, a counter associated with the threshold is incremented 718, and the process repeats. However, if the input/output operation is associated with data in the cache, a corresponding cache window is found 710 in a cache window list in temporal queue. In at least one embodiment, the cache windows are organized into hash lists. The physical cache window is unlinked 712 from the temporal queue and a new cache window list in the current temporal queue is calculated 714. The physical cache window is then inserted 716 into the calculated list and a counter associated with the threshold is incremented 718. The process repeats for each input/output operation.

Embodiments of the present invention are useful for preventing thrashing of a flash memory. By organizing cached data according to temporal windows, and amount of data accessed in each temporal window, a data storage system may identify cold cached data least likely to become hot and require re-escalation. The relative popularity of data in the cache is tracked on a more granular level. Furthermore, certain features of hot data, such as magnitude of access of particular memory blocks, and associating such magnitude with recency of access. Only the most lightly accessed data blocks in the oldest temporal queue are demoted out of the cache in favor of new hot data which will always be added to the newest temporal queue, thus guaranteeing that newly added data is not immediately demoted.

It is believed that the present invention and many of its attendant advantages will be understood by the foregoing description of embodiments of the present invention, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A computer apparatus, comprising:
    a processor;
    memory connected to the processor, at least a portion of the memory comprising a cache; and
    computer executable program code configured to execute on the processor,
    wherein the computer executable program code is configured to:
        receive an input/output operation;
        identify a cache window associated with data to be accessed pursuant to the input/output operation;
        remove the cache window from a prior temporal queue; and
        add the cache window to a current temporal queue comprising a plurality of cache window lists, each of the plurality of cache window lists configured to store one or more pointers to one or more cache windows.

2. The computer apparatus of claim 1, wherein each of the one or more cache window lists comprises a hash table.

3. The computer apparatus of claim 1, wherein:
    the computer executable program code is further configured to determine a cache window list in the current temporal queue based on a feature of the input output/output operation; and
    adding the identified cache window to the current temporal queue comprises adding the identified cache window to the determined cache window list.

4. The computer apparatus of claim 3, wherein the feature of the input/output operation comprises a number of cache lines accessed during the input/output operation.

5. The computer apparatus of claim 1, wherein:
    each of the prior temporal queue and current temporal queue are defined by a threshold number of input/output operations; and
    the computer executable program code is further configured to increment a counter of input/output operations.

6. The computer apparatus of claim 5, wherein the computer executable program code is further configured to alter the threshold number of input/output operations.

7. A data storage system, comprising:
a processor;
one or more data storage elements connected to the processor;
memory connected to the processor, at least a portion of the memory comprising a cache for the one or more data storage elements; and
computer executable program code configured to execute on the processor,
wherein the computer executable program code is configured to:
receive an input/output operation directed toward data in the cache;
identify a cache window associated with data to be accessed pursuant to the input/output operation;
remove the cache window from a prior temporal queue; and
add the cache window to a current temporal queue comprising a plurality of cache window lists, each of the plurality of cache window lists configured to store one or more pointers to one or more cache windows.

8. The data storage system of claim 7, wherein each of the one or more cache window lists comprises a hash table.

9. The data storage system of claim 7, wherein:
the computer executable program code is further configured to determine a cache window list in the current temporal queue based on a feature of the input/output operation; and
adding the identified cache window to the current temporal queue comprises adding the identified cache window to the determined cache window list.

10. The data storage system of claim 9, wherein the feature of the input/output operation comprises a number of cache lines accessed during the input/output operation.

11. The data storage system of claim 7, wherein:
each of the prior temporal queue and current temporal queue are defined by a threshold number of input/output operations; and
the computer executable program code is further configured to increment a counter of input/output operations.

12. The data storage system of claim 11, wherein the computer executable program code is further configured to alter the threshold number of input/output operations.

13. A method for maintaining hot data in a data storage system cache, comprising:
receiving an input/output operation directed toward data in a cache;
identifying a cache window associated with the data in the cache;
removing the cache window from a prior temporal queue; and
adding the cache window to a current temporal queue comprising a plurality of cache window lists, each of the plurality of cache window lists configured to store one or more pointers to one or more cache windows.

14. The method of claim 13, further comprising:
determining a cache window list in the current temporal queue based on a feature of the input/output operation,
wherein adding the identified cache window to the current temporal queue comprises adding the identified cache window to the determined cache window list.

15. The method of claim 14, wherein the feature of the input/output operation comprises a number of cache lines accessed during the input/output operation.

16. The method of claim 13, further comprising:
incrementing a counter of input/output operations,
wherein each of the prior temporal queue and current temporal queue are defined by a threshold number of input/output operations.

17. The method of claim 16, further comprising altering the threshold number of input/output operations.

* * * * *